US008140582B2

(12) United States Patent
Chen et al.

(10) Patent No.: US 8,140,582 B2
(45) Date of Patent: Mar. 20, 2012

(54) SERVICE ORIENTED ARCHITECTURE AGGREGATION

(75) Inventors: David D. Chen, Cary, NC (US);
Douglas E. Griswold, Apex, NC (US);
Lance A. Walker, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/246,574

(22) Filed: Oct. 7, 2008

(65) Prior Publication Data

US 2010/0088326 A1 Apr. 8, 2010

(51) Int. Cl.
*G06F 17/30* (2006.01)
(52) U.S. Cl. ......... 707/793; 707/756; 707/803; 717/162
(58) Field of Classification Search .................. 707/608, 707/756, 807, 809, 793, 803, 172
See application file for complete search history.

(56) References Cited

U.S. PATENT DOCUMENTS

| 7,761,533 | B2 * | 7/2010 | Angelov | 709/217 |
| 7,797,400 | B2 * | 9/2010 | Singh et al. | 709/219 |
| 7,814,470 | B2 * | 10/2010 | Mamou et al. | 717/162 |
| 7,840,669 | B2 * | 11/2010 | Dutta et al. | 709/224 |
| 7,912,810 | B2 * | 3/2011 | Wittmann et al. | 707/607 |
| 7,970,862 | B2 * | 6/2011 | Connor et al. | 709/217 |
| 8,041,760 | B2 * | 10/2011 | Mamou et al. | 709/200 |
| 2005/0223109 | A1 * | 10/2005 | Mamou et al. | 709/232 |
| 2006/0112122 | A1 | 5/2006 | Goldszmidt et al. | |
| 2007/0061487 | A1 * | 3/2007 | Moore et al. | 709/246 |
| 2007/0150493 | A1 | 6/2007 | Suzumura et al. | |
| 2007/0168461 | A1 * | 7/2007 | Moore | 709/217 |

OTHER PUBLICATIONS

Butek, Russell, "Web Services Tip: Use Polymorphism as an Alternative to XSD:Choice," www.ibm.com, Sep. 20, 2005, US.
Binstock, Cliff, "The choice Element," The XML Schema Complete Reference, 2002-2003, US.

* cited by examiner

*Primary Examiner* — Debbie Le
(74) *Attorney, Agent, or Firm* — Yudell Isidore Ng Russell PLLC

(57) ABSTRACT

A method, system and computer program product for identifying one or more niche services to combine into a common service, wherein the niche service is a part of a service oriented architecture (SOA). The extensible markup language (XML) schema of the one or more niche services is aggregated into a combined XML schema, wherein the combined XML schema is the XML schema of the common service. A web services description language (WSDL) of the one or more niche services are aggregated to establish a combined WSDL, wherein the combined WSDL is the WSDL of the common service. The common service is generated from the combined XML schema and the combined WSDL. The combined WSDL, utilized to identify the combined service, comprises a service provider URL, one or more service operations, and combined XML schema. The combined XML schema is associated with a common service request and a common service response. When the XML schema of the niche service is not equal with the combined XML schema, mediation is invoked.

20 Claims, 4 Drawing Sheets

SERVICE ORIENTED ARCHITECTURE AGGREGATION

BACKGROUND

1. Technical Field

The present invention generally relates to computer systems and in particular to service oriented architecture in computer systems.

2. Description of the Related Art

The foundation of service oriented architectures (SOAs) are services. Consumers working with services of SOAs have little control over factors such as the number and organization of services. The available services are often narrowly focused on a niche segment of the business services. Focusing primarily on a niche segment of the business services is of limited value and may slow the adoption of business associated SOAs.

Existing methods for utilizing business-level services involve the consumer understanding each niche service and invoking the correct service, based on specifics of the business transaction. Narrowly focused services result in either complex or numerous business process execution language (BPEL) workflows. Niche services create a problem for the consumer, wherein the consumer has to manage additional processes.

Interaction patterns have been defined which address narrowly focused services. The facade, broker, and router patterns each provide a high-level architecture enabling a single entry point into many services. However, current techniques and methods for providing a single entry point into services are complicated and difficult to incorporate into existing business systems.

SUMMARY OF ILLUSTRATIVE EMBODIMENTS

Disclosed are a method, system and computer program product for identifying one or more services to combine into a common service, where the original service is a part of a service oriented architecture (SOA). The extensible markup language (XML) schema of the one or more niche services is aggregated into a combined XML schema, wherein the combined XML schema is the XML schema of the common (aggregate) service. A web services description language (WSDL) of the one or more services are aggregated to establish a combined WSDL, wherein the combined WSDL is the WSDL of the common service. The common service is generated from the combined XML schema and the combined WSDL. The combined WSDL, utilized to identify the combined service, comprises a service provider URL, one or more service operations, and combined XML schema. The combined XML schema is associated with a common service request and a common service response. A consumer may call the common service request deployed on an Enterprise Service Bus (ESB). Based on the contents of the request, the ESB transforms the request into the original niche service format and forwards the request to the original niche service provider. The niche service response returns to the ESB where the niche service response originated, and is then transmitted back into the common service format and returned to the caller.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
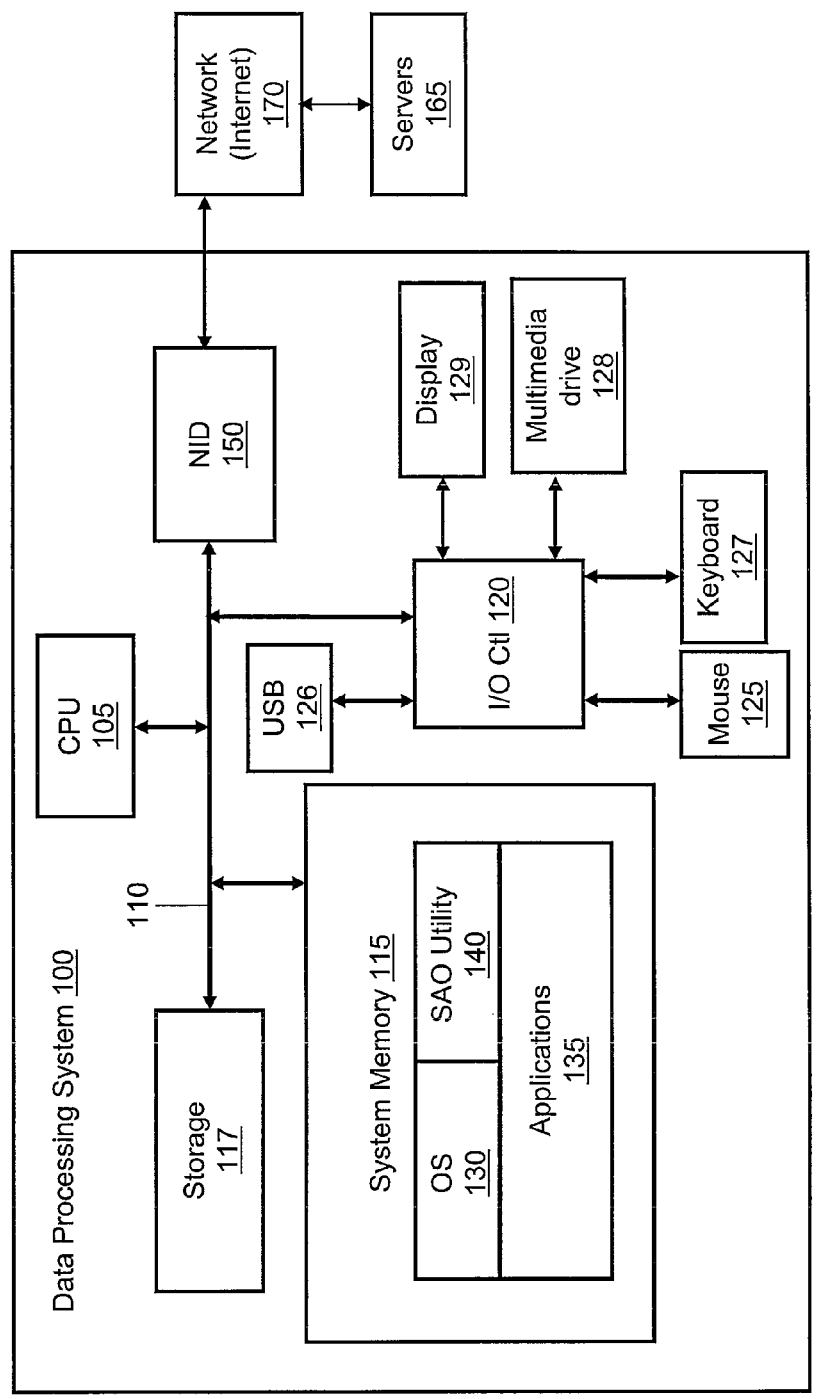
FIG. 1 is a block diagram of a data processing system, within which various features of the invention may advantageously be implemented according to one embodiment of the invention.

The illustrative embodiments provide a method, system and computer program product for identifying one or more niche services to combine into a common service, wherein the niche service is a part of a service oriented architecture (SOA). The extensible markup language (XML) schema of the one or more niche services is aggregated into a combined XML schema, wherein the combined XML schema is the XML schema of the common service. A web services description language (WSDL) of the one or more niche services are aggregated to establish a combined WSDL, wherein the combined WSDL is the WSDL of the common service. The common service is generated from the combined XML schema and the combined WSDL. The combined WSDL, utilized to identify the combined service, comprises a service provider URL, one or more service operations, and combined XML schema. The combined XML schema is associated with a common service request and a common service response. When the XML schema of the niche service is not equal with the combined XML schema, mediation is invoked.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term niche describes a narrowly scoped, or focused, service operation. The term common service describes a generic service in which one or more service is aggregated and included in a single service, or the common service. The general term "common service" may describe a common service request or a common service response.

Several descriptions below refer to niche services, whereby each niche service covers a small spectrum of the overall business (e.g. along geographic or product lines). When niche services are aggregated, the niche service may become more useful by covering a broader range of the business (e.g. multiple geographies or multiple product lines). Although niche services, which cover a broad range of a business, are a useful application of service aggregation, there are many other situations where service aggregation may also be useful. For example, a cost estimating application may require a common service interface to call several unrelated services that return cost estimates for labor, materials, licensing, etc.

With reference now to the figures, FIG. 1 depicts a block diagram representation of a data processing system (connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, multimedia drive 128 (e.g., CDRW or DVD drive) and USB (universal serial bus) port 126 are illustrated, coupled to I/0 controller 120. Multimedia drive 128 and USB port 126 may operate as both input and output (storage) mechanisms. DPS 100 also comprises storage 117, within which data/instructions/code may be stored.

DPS 100 is also illustrated with a network interface device (NID) 150, with which DPS 100 connects to one or more servers 165 via an access network, such as the Internet 170. In the described embodiments, Internet 150 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 110. Thus, illustrated within system memory 117 are a number of software/firmware components, including operating system (OS) 130 (e.g., Microsoft Windows®, a trademark of Microsoft Corp, GNU®/Linux®, registered trademarks of the Free Software Foundation and Linus Torvalds, or AIX®, a registered trademark of International Business Machines (IBM)), and applications 135, including service aggregation operation (SAO) utility 140. In actual implementation, SAO utility 145 may be combined with other services and/or applications as a single service and/or application collectively providing the various functions of each individual software component when the corresponding code is executed by CPU 105. For simplicity, SAO utility 140 is illustrated and described as a stand alone or separate software/firmware component, which provides specific functions, as described below.

CPU 105 executes SAO utility 140 as well as OS 130, which supports the user interface features of SAO utility 140. Among the software code/instructions provided by SAO utility 140, and which are specific to the invention, are: (a) code for identifying one or more services to combine into a common service, wherein the one or more services are a part of a service oriented architecture (SOA); (b) code for combining the one or more of the services into one of an extensible markup language (XML) schema and a web services description language (WSDL); and (c) code for generating the common service from the one or more services. For simplicity of the description, the collective body of code that enables these various features is referred to herein as SAO utility 140. According to the illustrative embodiment, when CPU 105 executes SAO utility 140, DPS 100 initiates a series of functional processes that enable the above functional features as well as additional features/functionality, which are described below within the description of FIGS. 2-7.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
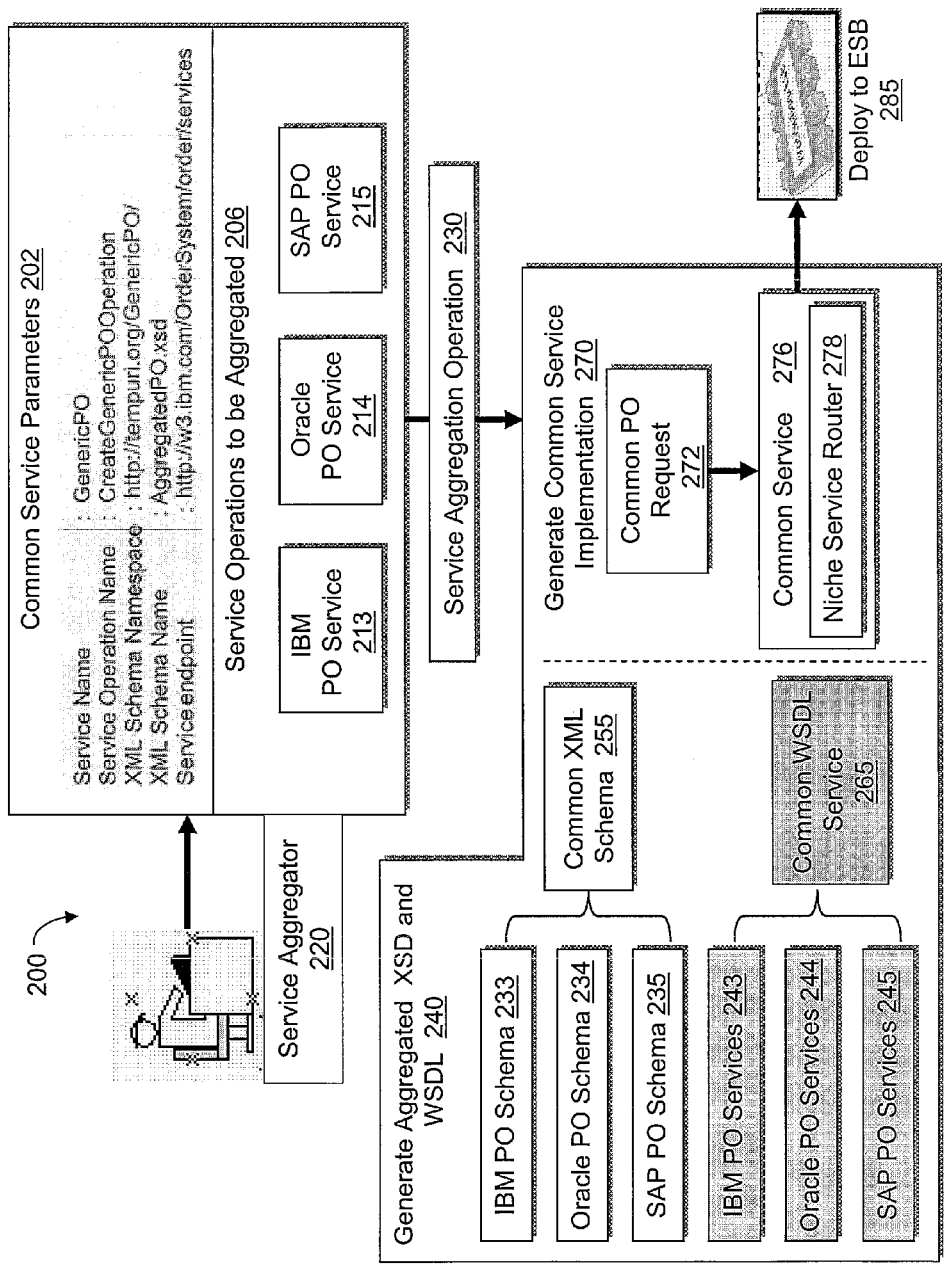
FIG. 2 is a diagram illustrating functions for generating aggregated service operations in accordance with one embodiment of the invention.

With reference now to FIG. 2, wherein is depicted a block diagram of a system for generating common purchase order (PO) services. The system of FIG. 2 comprises common service parameters 202, service operations to be aggregated 206, service aggregation operation 230, generate aggregated XSD and WSDL 240, and generate common service implementation 270. Included in service operations to be aggregated 206 are IBM PO service 213, Oracle PO service 214, and SAP PO service 215. Generate aggregated XSD and WSDL 240 includes common XML schema 255 and common WSDL service 265. Common XML schema comprises IBM PO schema 233, oracle PO schema 234, and SAP PO schema 235. Common WSDL services 265 comprise IBM PO services 243, oracle PO services 244, and SAP PO services 245. Generate common service implementation 270 includes common PO request 272, common service 276, niche service router 278, and EBS 285. Service aggregator 220 inputs parameters into new common service parameters 202.

In one embodiment a service aggregator inputs one or more common service parameters. Service Aggregator 220 inputs the new service parameters into common service parameters 202. Service aggregator 220 also identifies service operations to be aggregated 206, for example, IBM PO service operation 213, Oracle PO service operation 214, and SAP PO service operation 215. Entries to common service parameters 202 include, but are not limited to: service name, service operation name, XML schema name space, XML schema name, and service endpoint.

In one embodiment, one or more niche services are assigned to a common service, wherein the common service is the aggregated service. SAO utility 140 (FIG. 1) generates the common service definition, taking the niche service WSDL's selected operations, such as IBM PO services 243, oracle PO services 244, and SAP PO services 245, and processing the services to create common WSDL service 265. Similarly, the corresponding request and response XML schemas, such as IBM PO schema 233, oracle PO schema 234, and SAP PO schema 235, are processed to create common XML Schema 255.

In one embodiment, generate common service implementation 270 is generated by SAO utility 140 (FIG. 1) and transforms XML document instances of common PO request 272. Generate common service implementation 270 changes common XML schema 255 and common WSDL service 265 into one or more of the following original niche schema formats: IBM PO schema 233, oracle PO schema 234, and SAP PO schema 235. The common service generated via common service 276 determines what type of niche service is requested in the common PO request 272, and routes the request to the WSDL endpoint from the original niche service (213, 214, or 215). The common service newly generated by common service 276 is deployed via niche service router 278 to enterprise service bus (ESB) 260. ESB 260 transmits the common service to the endpoint as specified by the input parameters of the service aggregator, supplied in common service parameters 202.

Service aggregation enables selection of one or more service operations utilized to place orders (or create purchase orders). Service aggregation allows multiple types of purchase orders to be processed by a single service. In one embodiment, service operations may be provided via IBM PO service operation 213, Oracle PO service operation 214, and SAP PO service operation 215. One or more niche services (213, 214 and 215) are combined into a common service. Common WSDL service 265 is generated by SAO utility 140 and utilized to communicate with each of the three services. Common WSDL service 265 is utilized to generate a single language-specific binding that is engaged to invoke one or more of the three services provided via IBM PO service operation 213, Oracle PO service operation 214, and SAP PO service operation 215.

IBM, SAP, and Oracle applications are combined into common XML schema 255 and common WSDL service 265. In one embodiment, a common service implementation is generated from the original niche services selected for aggregation, the combined XML schema and the combined WSDL, along with the parameters identified for the new common service. One or more values are input into common service parameters 202, and the parameters are utilized to create the aggregate service. Values received by common service 202 include, but are not limited to, values for: service name, service operation name, XML schema name space, XML schema name, and service endpoint. A WSDL is defined for common WSDL service 265. WSDL information includes a service provider URL, a service operation name, and the XML schema (name/namespace) of the service request and service response for the service operation. Values that are not defined during aggregation of the niche services are input as constants, such as standard web service namespaces and WSDL element tags.

In one embodiment, an aggregated XML schema is built from the values received at common service parameters 202, and selected service operations (213, 214 and 215). A service request, response, and fault may be aggregated from one or more service operations selected for aggregation into common PO request 272. The name of the new common operation is identified by the service name input into common service parameters 202. The message associated with the new common operation is identified by the value of the service operation name input into common service parameters 202. The XML schema namespace of common service parameters 202 identifies the location of the new common XML schema. XML schema input, into common service parameters 202, identifies the new common XML schema file name. The destination of the aggregated service is identified via the value for service endpoint. The common service is deployed to the endpoint via ESB 260. Generating and appending a unique prefix to each schema element or attribute for each distinct service operation being aggregated resolves naming conflicts for aggregated XML schema.

In another embodiment, one or more values in a common request SOAP document, such as common PO request 272 are associated with the derived common service schema (IBM PO schema 233, oracle PO schema 234, and SAP PO schema 235). One or more values associated within the common service of the common request SOAP document identify the target niche service. The one or more values are received by the common request SOAP document, and the common request is routed to the original niche service endpoint (IBM PO service 213, Oracle PO service 214, and SAP PO service 215) via ESB 285.

Figure 3:
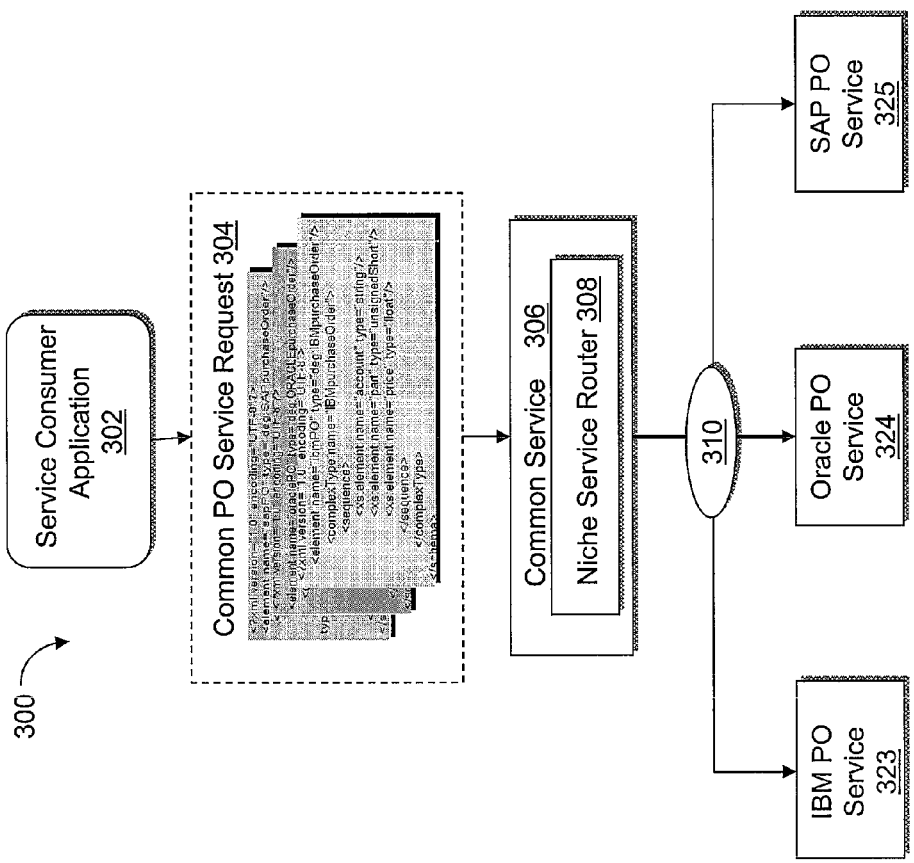
FIG. 3 is a diagram illustrating functions for dispatching aggregated service operations according to one embodiment of the invention.

FIG. 3, depicts functions of a system for dispatching aggregated service operations. System 300 of FIG. 3 comprises service consumer application 302, common service request 304, and common service 306. Common service 306 comprises niche service router 308. Router 310 automatically directs and/or routes service requests to one or more of the following original niche services: IBM PO service 323, Oracle PO service 324, and SAP PO service 325.

In one embodiment, one or more niche services are assigned to a common service, wherein the common service is the aggregated service. Common service request 304 comprises one or more applications, wherein the applications may be IBM PO service 323, Oracle PO service 324, and SAP PO service 325. Each application comprises a service to create a new purchase order. SAO utility 140 (FIG. 1) transfers common PO service requests (purchase order requests) 304 to common service 306. Common service 306 mediates the request, thereby creating a niche purchase order (PO) service request (e.g. IBM PO service 323, Oracle PO service 324, or SAP PO service 325). For two-way operations, on the return path, common service 306 manages the response or fault from the niche purchase order response or fault, and creates a common purchase order (PO) response or fault.

In one embodiment, one or more of an extensible stylesheet language transformations (XSLT) and Java are dynamically generated to identify one or more values of the common service (306). When the values of the common service are received, the utility (SAO utility 140) replaces the values of the common service with the values of the requested niche service. In addition, one or more XSLT and Java are dynamically generated to identify one or more values of the niche service. When the values of the niche service are received, the values of the niche service are replaced with the values of the common service.

In another embodiment, the common service (306) is associated with the niche services. Common service 306 is utilized to execute selection of a service. The service is automatically selected based on the parameters of common PO service requests 304. SAO utility 140 enables common service 306 to compare the format of common PO service requests 304 to the format of the niche PO service request. When the formats of common PO service requests 304 and the niche PO service request differ (e.g. if the common PO service request and the niche PO service request do not reference the same XML schema namespace), SAO utility 140 automatically modifies the formats of common PO service requests 304 and the niche PO service request. The format modification is dynamically enabled, thereby matching the formats of common PO service requests 304, and identifying the equivalent parameters within the common PO service requests 304 and the niche PO service request.

Figure 4:
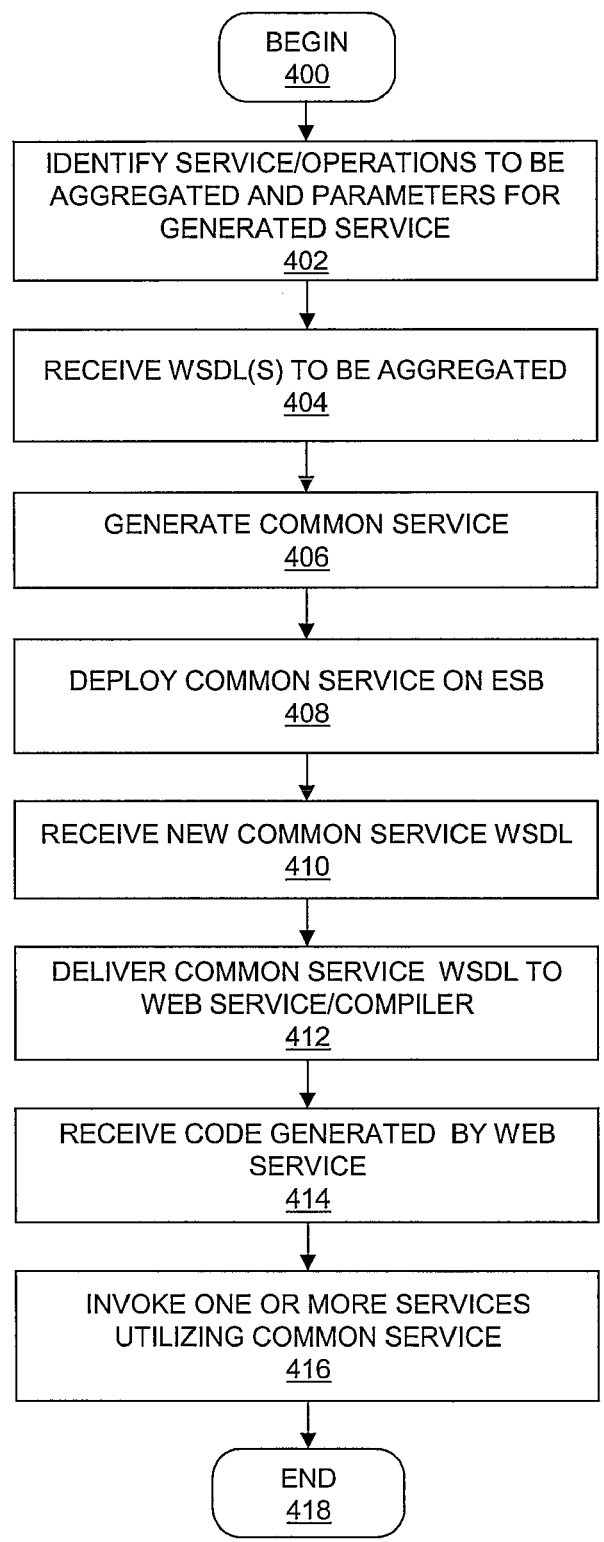
FIG. 4 is a logic flow chart for generating a common service according to one embodiment of the invention.

FIG. 4 is a flow chart illustrating various methods by which the above processes of the illustrative embodiments are completed. Although the methods illustrated in FIG. 4 may be described with reference to components shown in FIGS. 1-3, it should be understood that this is merely for convenience and alternative components and/or configurations thereof can be employed when implementing the various methods. Key portions of the methods may be completed by SAO utility 140 executing within DPS 100 (FIG. 1) and controlling specific operations on DPS 100, and the methods are thus described from the perspective of both SAO utility 140 and DPS 100.

FIG. 4 depicts the process for generating a common service. The process of FIG. 4 begins at initiator block 400 and proceeds to block 402, at which one or more niche services and/or operations are identified for aggregation, and common service parameters such as names and deployment location (service endpoint) are also identified. At block 404, one or more WSDLs of niche services to be aggregated are received. From the identified services, a common service is generated at block 406. At block 408 the common service is deployed via an enterprise service bus (ESB), for example Websphere ESB (WESB). A new common service WSDL is received at block 410. At block 412 the common service WSDL is delivered to an existing web service/compiler (e.g. Java Application Programming Interface (API) for XML-based remote procedure call (RPC) JAX-RPC compiler). Code generated by the web service for invoking the common service is received at block 414. One or more services are invoked, at block 416, utilizing the common service. The process ends at block 416.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
receiving one or more niche services to combine into a common service, wherein the niche service is a part of a service oriented architecture (SOA);
receiving one or more parameters to be associated with a name and a location of the common service;
combining an extensible markup language (XML) schema of the one or more niche services into a combined XML schema, wherein the combined XML schema is the XML schema of the common service;
combining a web services description language (WSDL) of the one or more niche services into a combined WSDL, wherein the combined WSDL is the WSDL of the common service;
generating a common service implementation comprising one or more of: a common purchase order (PO) request, the common service, a niche service router, and enterprise service bus (EBS), wherein generating the common service implementation changes common XML schema and common WSDL service into one or more original niche schema formats, wherein the common service implementation is generated from one or more of: an original niche service selected for aggregation, the combined XML schema, the combined WSDL, and the one or more parameters identified for the common service; and
deploying the common service to an endpoint via an enterprise service bus (ESB), wherein the ESB transmits the common service to the endpoint specified by input parameters of a service aggregator, supplied in common service parameters.

2. The method of claim 1, further comprising:
assigning a first WSDL, wherein the first WSDL is associated with a first URL that corresponds with the common service; and
assigning a second WSDL, wherein the second WSDL is associated with a second URL that corresponds with the niche service.

3. The method of claim 1, further comprising:
receiving the combined WSDL, wherein the combined WSDL is utilized to identify the combined service and includes a service provider URL, a service operation, and combined XML schema; and
associating the combined XML schema with a common service request and a common service response.

4. The method of claim 1, further comprising:
associating one or more values of the common service in a common request simple object access protocol (SOAP) document to a common service schema, wherein the one or more values identify a target niche service;
receiving the values of the common service; and
routing the common request SOAP document to the endpoint of the original niche service.

5. The method of claim 1, further comprising:
dynamically generating one or more of an extensible stylesheet language transformations (XSLT) and Java to identify one or more values of the common service;
in response to the values of the common service being received, replacing the values of the common service with the values of the requested niche service;
dynamically generating one or more of the XSLT and Java to identify the values of the niche service; and
in response to the values of the niche service being received, replacing the values of the niche service with the values of the common service.

6. The method of claim 1, further comprising:
automatically selecting a service when selection of the service is based on one or more parameters of the common service request;
dynamically enabling a format modification;
identifying one or more equivalent parameters within the common service requests and the niche service request; and
generating the new common service, wherein the new common service communicates with the one or more niche services.

7. The method of claim 1, further comprising:
in response to a format of the common service and a format of a niche service differing, dynamically modifying the format of the common service and the format of the niche service by matching one or more formats of common service requests.

8. A computer program product in a computer-readable storage medium comprising:
a computer-readable storage medium; and
program code on the computer-readable storage medium that when executed by a computer device provides the functions of:
receiving one or more niche services to combine into a common service, wherein the niche service is a part of a service oriented architecture (SOA);
receiving one or more parameters to be associated with a name and a location of the common service;
combining an extensible markup language (XML) schema of the one or more niche services into a combined XML schema, wherein the combined XML schema is the XML schema of the common service;
combining a web services description language (WSDL) of the one or more niche services in to a combined WSDL, wherein the combined WSDL is the WSDL of the common service;
generating a common service implementation comprising one or more of: a common purchase order (PO) request, the common service, a niche service router, and enterprise service bus (EBS), wherein generating the common service implementation changes common XML schema and common WSDL service into one or more original niche schema formats, wherein the common service implementation is generated from one or more of: an original niche service selected for aggregation, the combined XML schema, the combined WSDL, and the one or more parameters identified for the common service; and
deploying the common service to an endpoint via an enterprise service bus (ESB), wherein the ESB transmits the common service to the endpoint specified by input parameters of a service aggregator, supplied in common service parameters.

9. The computer program product of claim 8, further comprising program code for:
assigning a first WSDL, wherein the first WSDL is associated with a first URL that corresponds with the common service; and
assigning a second WSDL, wherein the second WSDL is associated with a second URL that corresponds with the niche service.

10. The computer program product of claim 8, further comprising program code for:
receiving the combined WSDL, wherein the combined WSDL is utilized to identify the combined service and includes a service provider URL, a service operation, and combined XML schema; and
associating the combined XML schema with a common service request and a common service response.

11. The computer program product of claim 8, further comprising program code for:
associating one or more values of the common service in a common request simple object access protocol (SOAP) document to a common service schema, wherein the one or more values identify a target niche service;
receiving the values of the common service; and
routing the request to the endpoint of the original niche service.

12. The computer program product of claim 8, further comprising program code for:
dynamically generating one or more of an extensible stylesheet language transformations (XSLT) and Java to identify one or more values of the common service;
in response to the values of the common service being received, replacing the values of the common service with the values of the requested niche service;
dynamically generating one or more of the XSLT and Java to identify the values of the niche service; and
in response to the values of the niche service being received, replacing the values of the niche service with the values of the common service.

13. The computer program product of claim 8, further comprising program code for:
automatically selecting a service when selection of the service is based on one or more parameters of the common service request;
dynamically enabling a format modification;

identifying one or more equivalent parameters within the common service requests and the niche service request; and generating the new common service, wherein the new common service communicates with the one or more niche services.

14. The computer program product of claim 8, further comprising program code for:

in response to a format of the common service and a format of a niche service differing, dynamically modifying the format of the common service and the format of the niche service by matching one or more formats of common service requests.

15. A computer system comprising:

a processor component;

a system memory; and a utility executing on the processor component and which comprises code that causes the processor component to:

receive one or more niche services to combine into a common service, wherein the niche service is a part of a service oriented architecture (SOA);

receive one or more parameters to be associated with a name and a location of the common service;

combine an extensible markup language (XML) schema of the one or more niche services into a combined XML schema, wherein the combined XML schema is the XML schema of the common service;

combine a web services description language (WSDL) of the one or more niche services in to a combined WSDL, wherein the combined WSDL is the WSDL of the common service;

generate a common service implementation comprising one or more of: a common purchase order (PO) request, the common service, a niche service router, and enterprise service bus (EBS), wherein generating the common service implementation changes common XML schema and common WSDL service into one or more original niche schema formats, wherein the common service implementation is generated from one or more of: an original niche service selected for aggregation, the combined XML schema, the combined WSDL, and the one or more parameters identified for the common service;

in response to a format of the common service and a format of a niche service differing, dynamically modify the format of the common service and the format of the niche service by matching one or more formats of common service requests; and deploy the common service to an endpoint via an enterprise service bus (ESB), wherein the ESB transmits the common service to the endpoint specified by input parameters of a service aggregator, supplied in common service parameters.

16. The computer system of claim 15, the utility further comprising code that causes the processor component to:

assign a first WSDL, wherein the first WSDL is associated with a first URL that corresponds with the common service; and assign a second WSDL, wherein the second WSDL is associated with a second URL that corresponds with the niche service.

17. The computer system of claim 15, the utility further comprising code that causes the processor component to:

receive the combined WSDL, wherein the combined WSDL is utilized to identify the combined service and includes a service provider URL, a service operation, and combined XML schema; and associate the combined XML schema with a common service request and a common service response.

18. The computer system of claim 15, the utility further comprising code that causes the processor component to:

associate one or more values of the common service in a common request simple object access protocol (SOAP) document to a common service schema, wherein the one or more values identify a target niche service;

receive the values of the common service; and route the request to the endpoint of the original niche service.

19. The computer system of claim 15, the utility further comprising code that causes the processor component to:

dynamically generate one or more of an extensible stylesheet language transformations (XSLT) and Java to identify one or more values of the common service;

in response to the values of the common service being received, replace the values of the common service with the values of the requested niche service;

dynamically generate one or more of the XSLT and Java to identify the values of the niche service; and in response to the values of the niche service being received, replace the values of the niche service with the values of the common service.

20. The computer program product of claim 15, the utility further comprising code that causes the processor component to:

automatically select a service when selection of the service is based on one or more parameters of the common service request;

dynamically enable a format modification;

identify one or more equivalent parameters within the common service requests and the niche service request; and generate the new common service, wherein the new common service communicates with the one or more niche services.

* * * * *